No. 734,788. PATENTED JULY 28, 1903.
F. E. WILCOX.
VEHICLE GEAR.
APPLICATION FILED DEC. 30, 1902.
NO MODEL.
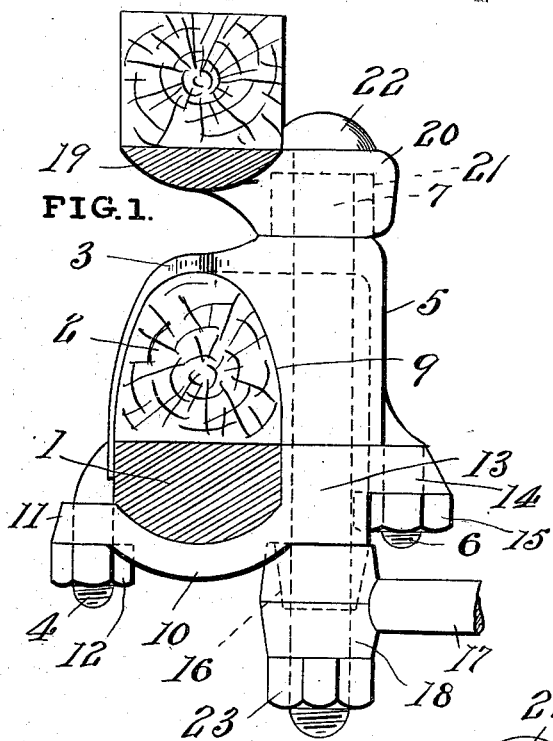
FIG. 1.
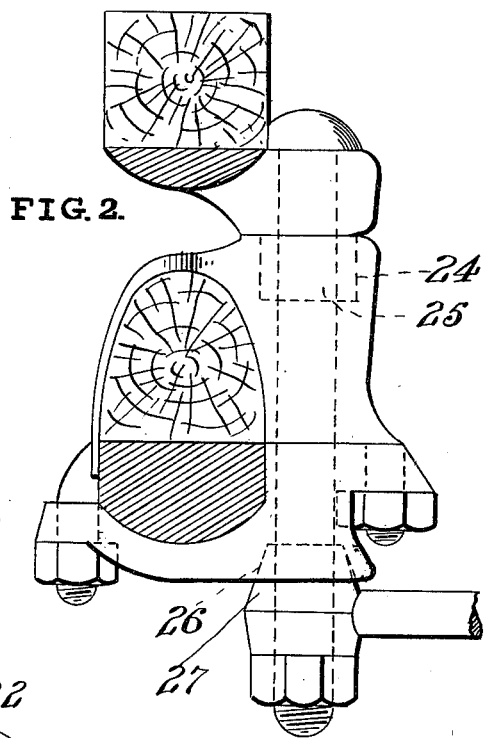
FIG. 2.
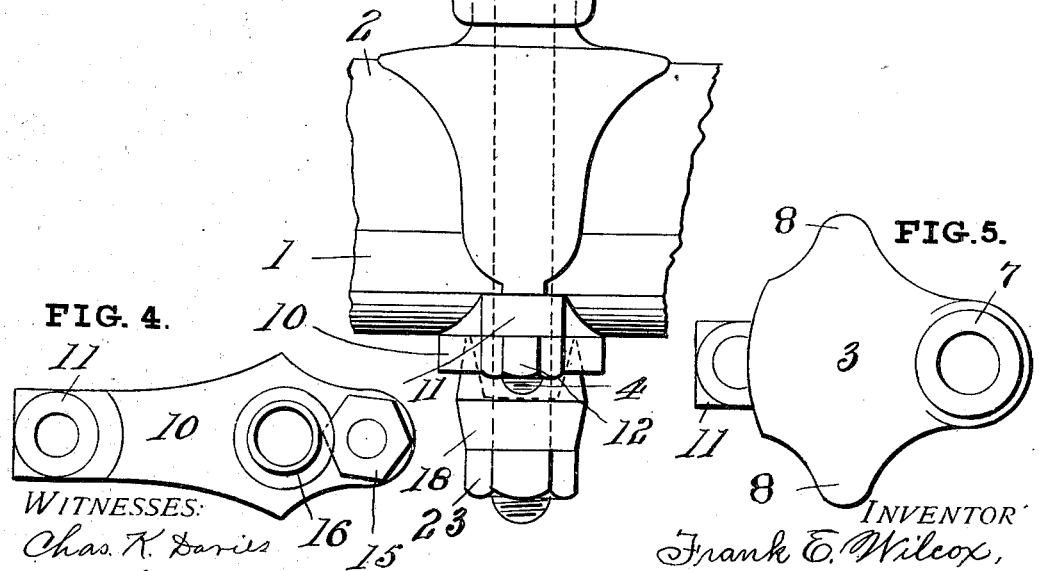
FIG. 3.
FIG. 4.
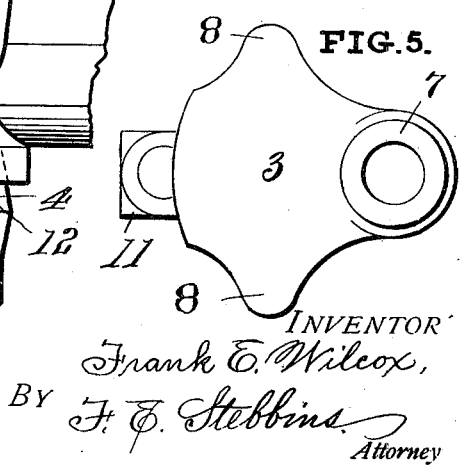
FIG. 5.
WITNESSES:
Chas. K. Davies
Chas. S. Mason.
INVENTOR
Frank E. Wilcox,
BY F. E. Stebbins.
Attorney
THE NORRIS PETERS CO., PHOTO-LITHO., WASHINGTON, D. C.

No. 734,788.

Patented July 28, 1903.

UNITED STATES PATENT OFFICE.

FRANK E. WILCOX, OF MECHANICSBURG, PENNSYLVANIA.

VEHICLE-GEAR.

SPECIFICATION forming part of Letters Patent No. 734,788, dated July 28, 1903.

Application filed December 30, 1902. Serial No. 137,131. (No model.)

*To all whom it may concern:*

Be it known that I, FRANK E. WILCOX, a citizen of the United States, residing at Mechanicsburg, in the county of Cumberland and State of Pennsylvania, have invented new and useful Improvements in Vehicle-Gears, of which the following is a specification.

The object of my invention is the production of an improved gear which shall be very simple in construction, comprised of few parts, comparatively cheap in first cost, easily applied and detached, which shall be strong and durable, and adapted to perform the requisite functions appertaining to a perfect gear.

With this end in view my invention consists in certain novelties of construction and combinations of parts hereinafter set forth and claimed.

The accompanying drawings illustrate an example and one modification of the physical embodiment of my invention constructed according to the best modes I have so far devised for the application of the principle.

Figure 1 is a side view in elevation of the improved gear, the head-block plate, axle, and axle-cap being shown in section. Fig. 2 is a view similar to Fig. 1, except that the interlocking elements are reversed. Fig. 3 is a front elevation view of Fig. 1. Fig. 4 is a bottom plan view of Fig. 1 with the brace and brace-head removed. Fig. 5 is a top plan view of the clip.

Referring in particular to Figs. 1, 3, 4, and 5 of the drawings, the numeral 1 designates the axle; 2, the axle cap or bed; 3, the clip as a whole; 4, the bolt end of the clip; 5, the longitudinally-perforated barrel of the clip made hollow, as shown by dotted lines; 6, the threaded bolt at the end of the barrel; 7, the perforated cylindrical bearing at the upper end of the barrel; 8, the wings of the clip; 9, the curved edge of the barrel which fits the contour of the axle-cap; 10, the axle-yoke; 11, the perforated front end of the yoke; 12, a nut on the bolt end of the clip; 13, the perforated rear end of the yoke; 14, a perforated lug; 15, a nut on the bolt 6 of the barrel; 16, a perforated frusto-conical projection on the axle-yoke; 17, the brace; 18, the perforated brace-head provided with a frusto-conical recess; 19, the head-block plate; 20, a perforated lug in the rear of the plate; 21, a recess to receive the bearing 7 at the upper end of the barrel; 22, the king-bolt, and 23 the nut on the end of the king-bolt.

Fig. 2 illustrates the interlocking parts reversed.

The numeral 24 designates a recess in the top end of the barrel of the clip; 25, a cylindrical bearing-lug projecting from the head-block plate, the same being perforated.

26 is a frusto-conical recess made in the rear of the axle-yoke, and 27 is the frusto-conical end of the brace-head.

The method of assembling the several parts and elements is obvious and need not be specifically set forth.

From the foregoing description, taken in connection with the drawings, it is clear that I have produced an improved gear which is very simple in construction and comparatively cheap to manufacture, which is strong and durable, which fulfils all the conditions set forth as the purpose of my invention, and which constitutes an important advance in the particular art.

While I have illustrated only two examples of the physical embodiment of my invention, I do not thereby intend to limit its scope to the particular shapes and dimensions disclosed, inasmuch as changes and modifications may be introduced at the will of the manufacturer without constituting substantial departures.

What I claim as new, and desire to secure by Letters Patent, is—

1. The combination with the clip having a front bolt end 4 and a perforated barrel, of a yoke provided with means for interlocking with a brace-head, said yoke being secured at its front and rear ends to the clip by nut 12, and by bolt 6 and nut 15 at the rear of the barrel.

2. The combination with the clip having a barrel provided at its upper end with means for interlocking with a head-block plate and a threaded bolt at its lower end, of a yoke perforated at its ends and secured to the clip and its barrel by nuts 12 and 15, in substance as set forth.

3. The combination with an axle, head-block plate, and brace having a head, of a clip provided with a barrel having a threaded bolt at its rear; an axle-yoke secured to the front end of the clip and to the bolt of the barrel; and a king-bolt and nut; the said barrel interlocking with the head-block plate and with the brace-head.

4. The combination with an axle, of a clip 3 having a bolt end 4 and a hollow barrel 5 with a threaded bolt at its lower end; a yoke perforated at its front and rear ends and secured to the two bolts of the clip and the barrel by nuts.

In testimony whereof I affix my signature in presence of two witnesses.

FRANK E. WILCOX.

Witnesses:
S. H. BAILEY MERCER,
H. H. MERCER.